Dec. 1, 1953  J. R. EVANS  2,661,130
SPARE TIRE AND WHEEL CARRIER
Filed April 15, 1950  2 Sheets-Sheet 1
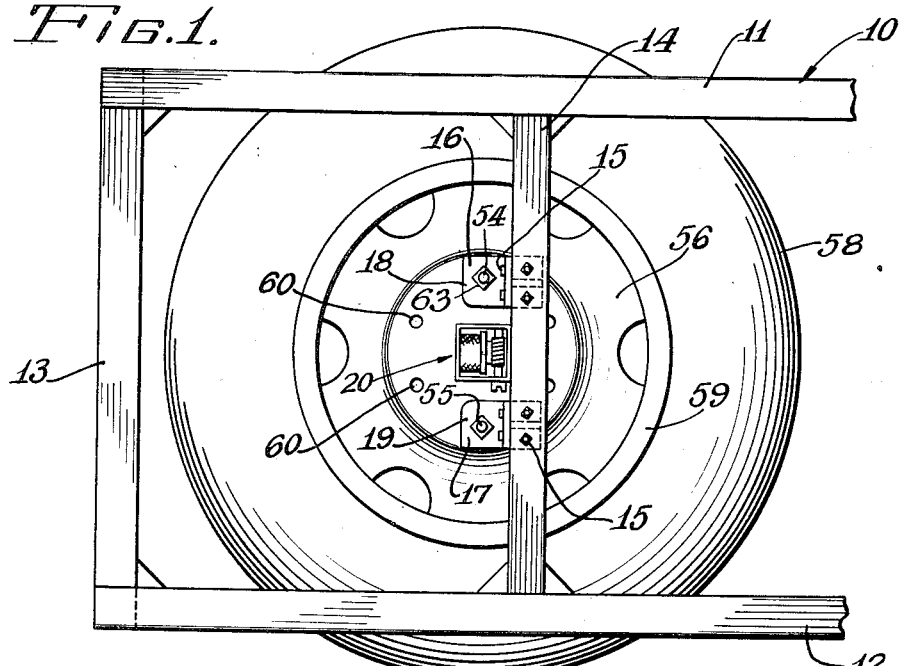
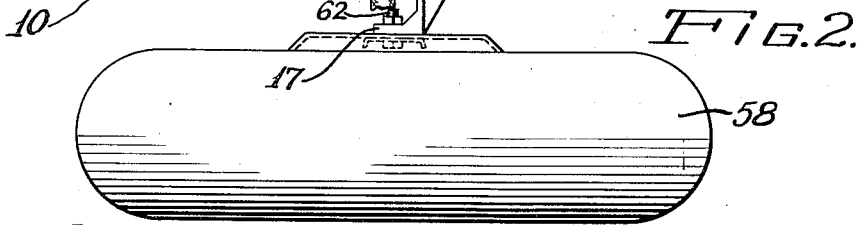
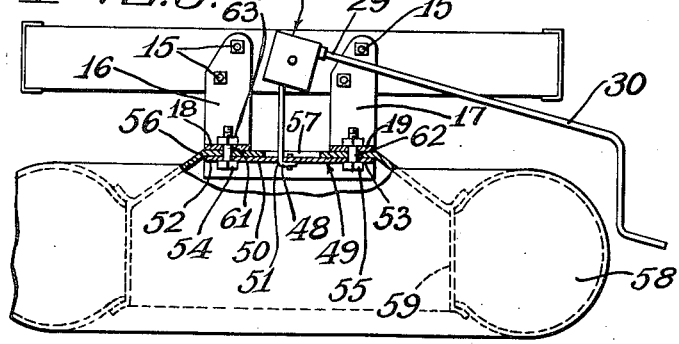
Inventor:
John Richard Evans
Paul O. Pippel
Atty.

Dec. 1, 1953 J. R. EVANS 2,661,130
SPARE TIRE AND WHEEL CARRIER
Filed April 15, 1950 2 Sheets-Sheet 2
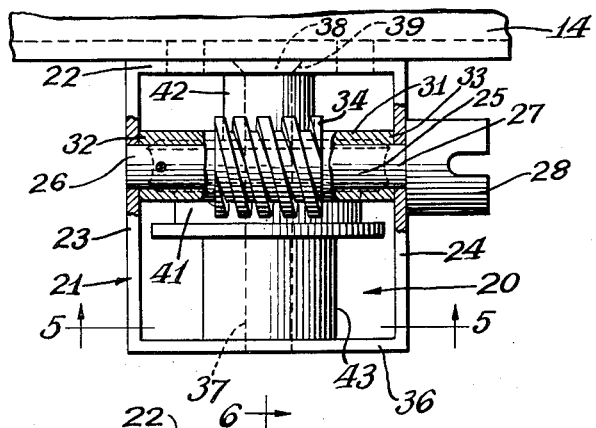
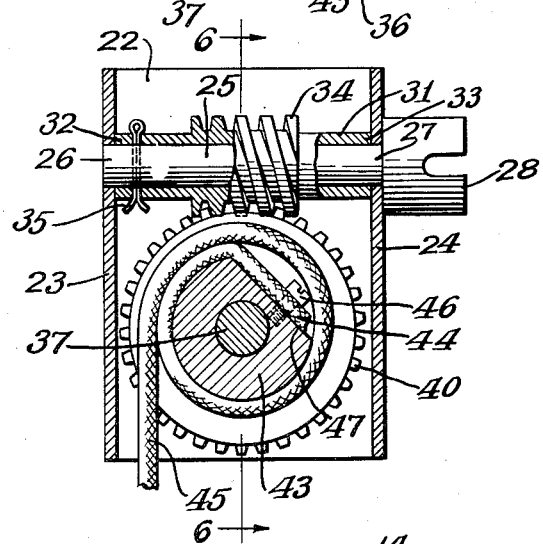
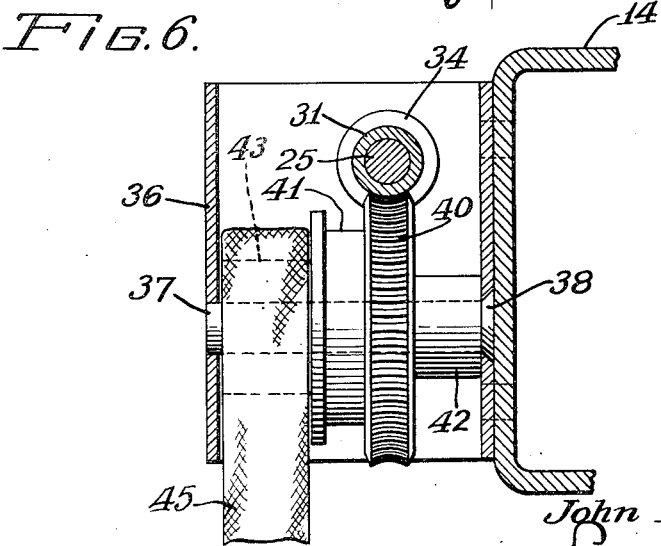
Inventor:
John Richard Evans Patented Dec. 1, 1953

2,661,130

UNITED STATES PATENT OFFICE 2,661,130

SPARE TIRE AND WHEEL CARRIER

John R. Evans, Fort Wayne, Ind.

Application April 15, 1950, Serial No. 156,102

6 Claims. (Cl. 224—42.22)

This invention relates to a new and improved spare tire and rim or wheel carrier for automotive vehicles and more particularly to a type of carrier adapted to carry a heavy truck tire and wheel.

The increased demand for greater pay load hauling per truck has resulted in larger trucks with correspondingly larger and heavier truck tires and wheels. The solution to the problem of storing the spare tire and wheel for ready and safe removal has been attempted by many without too much success. Devices have been used in the form of slings or baskets pivotally attached to the underside of the vehicle chassis frame. However, a survey of the prior devices reveals that they are either extremely difficult to handle and require considerable expenditure of manual effort or they are unsafe and endanger the life of the person using the device. Those which employ a winch type elevating means for lifting the tire and wheel assembly into engagement with the support on the chassis frame are generally provided with a pawl and ratchet in order to lock the assembly in any position off the ground. Obviously when it is desired to lower the assembly it is necessary to release the pawl from the ratchet with the result that the operator of the winch must restrain the full load of the wheel assembly until it rests upon the ground. Furthermore, since the pawl and ratchet are exposed to water, dust and ice, it is oftentimes difficult to release the pawl. One of the primary objects of the present invention is, therefore, the provision of a new and improved spare tire and wheel carrier which can be operated by one person with a minimum of physical effort and with maximum safety.

Another object is to provide a spare tire and wheel carrier which permits the positive locking of the wheel assembly at any point off the ground.

Still another object is the incorporation of an automatic drive release feature to the elevating mechanism whereby the driving element of the mechanism must be actuated to release the brake on the drive mechanism and thereby raise and lower the wheel assembly.

A further object is the provision of an elevating means which includes a worm and worm gear type of winch which is mounted in a compact housing.

A still further object is the provision of a wheel centering and securing means carried by the wheel engaging element of the carrier means which is adapted to project through a portion of the wheel and engage the wheel supporting structure on the chassis frame.

Another object is to provide an elevating mechanism in which there is a safety pin which will break if the mechanism is overloaded or misused while raising the wheel assembly without permitting the assembly to fall to the ground.

The foregoing and other important objects and desirable features inherent in and encompassed by the invention together with many of the purposes and uses thereof will become readily apparent from a reading of the ensuing description in conjunction with the annexed drawings in which:

Fig. 1 is a plan view of the invention.

Fig. 2 is a side elevational view of the invention showing the tire and wheel assembly in its raised or stored position.

Fig. 3 is a rear elevational view showing a tire wrench or crank operatively connected to the elevating means.

Fig. 4 is an enlarged plan view of the winch.

Fig. 5 is an enlarged sectional view taken substantially along line 5—5 of Fig. 4.

Fig. 6 is an enlarged sectional view taken substantially along line 6—6 of Fig. 5.

Referring to the drawings in which like reference characters designate like elements throughout the various views, a portion of a truck chassis frame is denoted generally by numeral 10. The frame includes a pair of laterally spaced longitudinally extending frame members 11 and 12 rigidly fastened together by means of transversely disposed cross frame members 13 and 14.

Suitably attached to the cross frame member 14 as by means of bolts 15 are a pair of laterally spaced brackets 16 and 17. Each bracket 16 and 17 has a rearwardly projecting portion 18, 19 with a vertically disposed aperture 61, 62 formed therein. The purpose of the brackets will be explained hereinafter. The elevating means designated generally by numeral 20 includes an open ended housing 21. The housing 21 is supported on the cross frame member 14 approximately midway between the brackets 16, 17 and has one wall 22 abutting the frame member 14. It will be noted that the housing 21 is angularly disposed whereby the oppositely facing side walls 23, 24 are not parallel to the side frame members 11, 12. Positioned in the upper part of the housing 21 is a rotatable shaft 25 having its ends 26, 27 journaled in the side walls 23, 24. The shaft 25 projects outwardly and downwardly from side wall 24 and is provided with a socket 28 for receiving one end 29 of a tire wrench 30.

It will be appreciated that shaft 25 can be conveniently rotated from the side of the motor vehicle without the necessity of drilling access holes in the side frame member 12 in order to engage the wrench 30 with the socket 28. A sleeve 31 is carried on the shaft 25. The sleeve 31 has its ends 32, 33 abutting the inner surface of side walls 23, 24 respectively to prevent lateral movement of the sleeve with respect to the shaft 25. Worm teeth 34 are formed on the exterior of the sleeve 31. The sleeve 31 is keyed to the shaft 25 by means of a shear pin 35 whereby the shaft and sleeve rotate together as a unit under normal operating conditions. Journaled in the side walls 22, 36 of the housing 21 is a shaft 37 having its rotational axis perpendicular to and vertically spaced from the rotational axis of the shaft 25. One end 38 of the shaft 37 is rotatably journaled in a countersunk portion 39 of the side wall 22. Thus it will be obvious that when the shaft 37 is assembled in the housing 21 and the housing is mounted on the cross frame member 14, shaft 37 is prevented from moving in the direction of its rotational axis without the need of costly pins and collars.

Keyed to the shaft 37 for rotation therewith is a worm gear or wheel 40 which meshes with the worm teeth 34. Gear 40 has a hub portion 41, 42 projecting from each side thereof. Both hub portions 41, 42 abut the side walls 22, 36 adjacent thereto and thus prevent longitudinal movement of the gear with respect to the housing 21. Hub portion 41 has a cable drum 43 formed thereon to which one end 44 of a braided strap 45 is rigidly attached. The strap 45 may be fastened to the drum 43 by passing a bolt 46 through the strap 45 and a threaded aperture formed in a flattened surface 47 on the drum 43.

The other end 48 of the strap 45 is attached to the carrier means designated generally by numeral 49. The carrier means 49 comprises a horizontally disposed bar 50 which has a slot 51 formed therein midway between the end portions 52, 53 for receiving the end 48 of the strap 45 which is secured to the bar 50 by any suitable means such as a clip or U-bolt. Adjacent each end portion 52, 53 is a vertically upwardly projecting stud 54, 55. The studs 54, 55 are welded to the bar 50 and constitute a part of the centering and securing means for the spare tire and wheel assembly.

The present invention was primarily designed for use with a truck or bus wheel of the type which has a disk or annular flange portion 56 provided with a centrally located hole 57 for the insertion of the axle hub. A tire 58 is mounted on a rim 59 which is suitably clamped to the disk 56. Encircling the hole 57 are a plurality of circumferentially spaced apertures 60 for receiving the mounting studs of the driving axle disk (not shown). It will be noted that the distance between any two of the apertures 60 which are diametrically disposed is the same. The studs 54, 55 are spaced apart the same distance that apertures 61, 62 are spaced apart which is equal to the diametrical distance between any two of the apertures 60.

When it is desired to mount a spare tire and wheel assembly on the chassis frame the operation of the carrier is as follows. The tire wrench or crank 30 is inserted in the socket 28 and rotated to lower the bar 50. Shaft 25 and cable drum 43 are drivingly connected through the medium of worm 34 and worm gear 40 as described hereinbefore. The tire and wheel assembly to be stored is slid beneath the chassis frame to a position substantially directly below the brackets 16, 17. When in this position the bar 50 is inserted in the hole 57 of the disk 56 and caused to bridge the hole. The spaced studs 54, 55 are aligned with any two of the apertures 60 which are diametrically disposed and project therethrough. The wrench 30 is then rotated in a direction to wind the strap on the cable drum 43 and raise the tire and wheel assembly to the cross frame member 14. Inasmuch as a braided strap is used rather than a cable or other flexible means the possibility of jamming the flexible means or winding it unevenly on the cable drum is reduced. Furthermore, practically no aligning of the studs 54, 55 with the apertures 61, 62 is necessary. When in its raised position studs 54, 55 project through the apertures 61, 62. Thereafter, nuts 63 are threaded on the studs 54, 55 to securely mount the tire and wheel assembly on the brackets 16 and 17.

In order to use the spare tire and wheel assembly the nuts 63 are removed from the studs 54, 55. The shaft 25 is then rotated to lower the assembly to the ground. The braided strap 45 is slackened slightly to permit tilting of the bar 50 and disengagement of the bar with the tire and wheel assembly. The load of the tire and wheel assembly is never fully imposed on the operator of the elevating means since an automatic drive release feature is inherent in the elevating transmission. In other words, it is necessary to rotate the worm to drive the worm gear to raise or lower the carrier means. The weight of the tire and wheel assembly will not rotate the worm because the extremely small force component tending to rotate the worm is insufficient to cause rotation.

It is obvious that the shear pin 35 which drivingly connects the sleeve 31 and the shaft 25 will shear if the carrier is overloaded, because of extreme misuse, or for other reasons. Should this occur while raising the tire and wheel assembly the shaft 25 will be free to rotate independently of the sleeve and thus prevent the operator from breaking any of the various components making up the carrier by overloading the device. Furthermore, the assembly would not fall to the ground and possibly injure someone since the force component acting to rotate the worm is insufficient to cause rotation.

The embodiment of the invention chosen for the purposes of illustration and description herein is that preferred as the result of selective tests based upon the requirements for achieving the objects of the invention and developing the utility thereof in the most desirable manner. It will be appreciated, therefore, that the particular structural and functional aspects emphasized herein are not intended to exclude but rather to suggest such other adaptations and modifications as fall within the spirit and scope of the invention as defined in the appended claims.

What is claimed is:

1. A spare tire and wheel carrier for a vehicle having a frame including a pair of laterally spaced, longitudinally extending members; a cross frame member extending between said longitudinally extending members; supporting means rigidly fastened to said cross frame member, said means including a pair of laterally spaced brackets, said brackets each having a vertically disposed aperture formed therein; carrier means adapted to removably mount a spare tire and rim, said carrier means comprising a horizontally disposed bar; elevating means mounted on said cross frame member for moving said carrier means vertically with respect to said cross frame member from a lower position in which the tire and rim may be mounted or dismounted on the carrier means to an upper position adjacent said supporting means, said elevating means comprising a housing having a rotatable shaft mounted therein, a sleeve carried by said shaft having a worm formed thereon, a shear pin drivingly connecting said sleeve and shaft, a gear rotatably mounted within said housing meshable with said worm, a cable drum rigidly attached to said gear, and a braided strap having one end connected to said cable drum and the other end fastened to said carrier means; centering and securing means carried by said carrier means engageable with the apertures of said brackets and portions of said rim to support the tire and rim in its upper position, said means including a pair of laterally spaced, vertically upwardly projecting studs.

2. A spare tire and wheel carrier for a vehicle having a frame including a pair of laterally spaced, longitudinally extending members; a cross frame member extending between said longitudinally extending members; supporting means rigidly fastened to said cross frame member, said means including a pair of laterally spaced brackets, said brackets each having a vertically disposed aperture formed therein; carrier means adapted to removably mount a spare tire and rim; elevating means mounted on said cross frame member for moving said carrier means vertically with respect to said cross frame member from a lower position in which the tire and rim may be mounted or dismounted on the carrier means to an upper position adjacent said supporting means, said elevating means including a rotatable worm, a worm wheel having a cable drum rotated thereby and a flexible braided strap having one end connected to said cable drum and the other end fastened to said carrier means; centering and securing means carried by said carrier means engageable with the apertures of said brackets and portions of said rim to support the tire and rim in its upper position.

3. A spare tire and wheel carrier for an automotive vehicle having a frame; supporting means rigidly mounted on said frame, said means including a pair of laterally spaced brackets, said brackets each having a vertically disposed aperture formed therein; carrier means adapted to removably mount a spare tire and rim, said carrier means comprising a horizontally disposed bar; elevating means mounted on said frame for moving said carrier means vertically with respect to said frame from a lower position in which the tire and rim may be mounted or dismounted on the carrier means to an upper position adjacent said supporting means, said means including a drive release which comprising a rotatable worm meshable with a worm gear; centering and securing means carried by said carrier means engageable with the apertures of said brackets and portions of said rim to support the tire and rim in its upper position, said means including a pair of spaced, upwardly projecting studs.

4. In combination with an automotive vehicle chassis of the type having a pair of transversely spaced, longitudinally extending frame members; a cross frame member extending between said longitudinally extending frame members; supporting means rigidly fastened to said cross frame member including a pair of laterally spaced brackets, said brackets each having a vertically disposed aperture formed therein; elevating means mounted on said cross frame member including a flexible element, a rotatable worm meshable with a worm gear, said flexible element being operatively connected to said worm gear; wheel engaging means attached to said flexible element for liftingly engaging a central part of a wheel; wheel centering and securing means carried by said wheel engaging means engageable with the apertures of said brackets and the central part of the wheel to support the wheel when the wheel has been lifted into elevated position.

5. An automotive vehicle spare tire and wheel carrier for wheels having an annular flange portion provided with a plurality of circumferentially spaced apertures therein comprising supporting means rigidly fastened to the underside of the automobile, said means including a pair of laterally spaced brackets, said brackets each having a vertically disposed aperture formed therein; carrier means adapted to engage the underside of said annular flange portion; elevating means mounted on the automobile adjacent said supporting means for moving said carrier means vertically with respect to said supporting means from a lower position in which the tire and wheel may be mounted or dismounted on the carrier means to an upper position adjacent said supporting means, said elevating means including a flexible member having one end secured to said carrier means and its opposite end attached to a cable drum, said elevating means further including a rotatable worm meshable with a worm gear rigidly attached to said cable drum; centering and securing means carried by said carrier means adapted to project through any two of said plurality of apertures formed in said annular flange portion which are diametrically disposed, said means being engageable with the apertures of said brackets to support the tire and wheel in its upper position.

6. An automotive vehicle spare tire and wheel carrier set forth in claim 5 in which the centering and securing means includes a pair of spaced, upwardly projecting studs.

JOHN R. EVANS.

References Cited in the file of this patent

UNITED STATES PATENTS

| Number | Name | Date |
|---|---|---|
| 1,761,916 | Hebner | June 3, 1930 |
| 1,983,767 | Mueller | Dec. 11, 1934 |
| 2,028,945 | Morrison | Jan. 28, 1936 |
| 2,131,746 | Morrison | Oct. 4, 1938 |
| 2,325,848 | Gildea et al. | Aug. 3, 1943 |
| 2,400,274 | Ullman | May 14, 1946 |

FOREIGN PATENTS

| Number | Country | Date |
|---|---|---|
| 327,659 | Great Britain | Apr. 10, 1930 |
| 736,582 | France | Sept. 20, 1932 |